(12) United States Patent
DiBenedetto et al.

(10) Patent No.: US 8,961,100 B2
(45) Date of Patent: Feb. 24, 2015

(54) VALVE FOR CONTROLLING FLOW OF A TURBOMACHINE FLUID

(75) Inventors: Enzo DiBenedetto, Torrington, CT (US); Francis Parnin, Suffield, CT (US); Robert E. Peters, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 693 days.

(21) Appl. No.: 13/220,631

(22) Filed: Aug. 29, 2011

(65) Prior Publication Data
US 2013/0048091 A1    Feb. 28, 2013

(51) Int. Cl.
*F01D 25/18* (2006.01)
*F01D 25/20* (2006.01)
*F01D 25/22* (2006.01)

(52) U.S. Cl.
CPC ............... *F01D 25/20* (2013.01); *F01D 25/22* (2013.01); *F05D 2240/50* (2013.01)
USPC ............. 415/1; 415/112; 137/38; 137/606

(58) Field of Classification Search
USPC ........................... 415/1, 112; 137/38, 44, 606
See application file for complete search history.

(56) References Cited

U.S. PATENT DOCUMENTS

| | | | |
|---|---|---|---|
| 2,941,622 A | 6/1960 | Mosley | |
| 3,335,736 A | 8/1967 | Liebel et al. | |
| 3,500,750 A | 3/1970 | Vohl | |
| 3,572,048 A * | 3/1971 | Murphy | 62/50.2 |
| 3,590,955 A | 7/1971 | Rau | |
| 4,631,009 A | 12/1986 | Cygnor et al. | |
| 7,225,784 B2 | 6/2007 | Takano | |
| 2010/0294371 A1 * | 11/2010 | Parnin et al. | 137/1 |

* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

An exemplary valve device for controlling flow of a turbomachine fluid includes a housing and a flow control assembly within the housing. The housing has a first inlet, a second inlet, and an outlet. Movement of the housing to a first orientation causes the flow control assembly to move to a first position to restrict flow of a turbomachine fluid into the housing through the second inlet. Movement of the housing to a second orientation causes the flow control assembly to move to a second position to restrict flow of the turbomachine fluid into the housing through the first inlet.

18 Claims, 4 Drawing Sheets

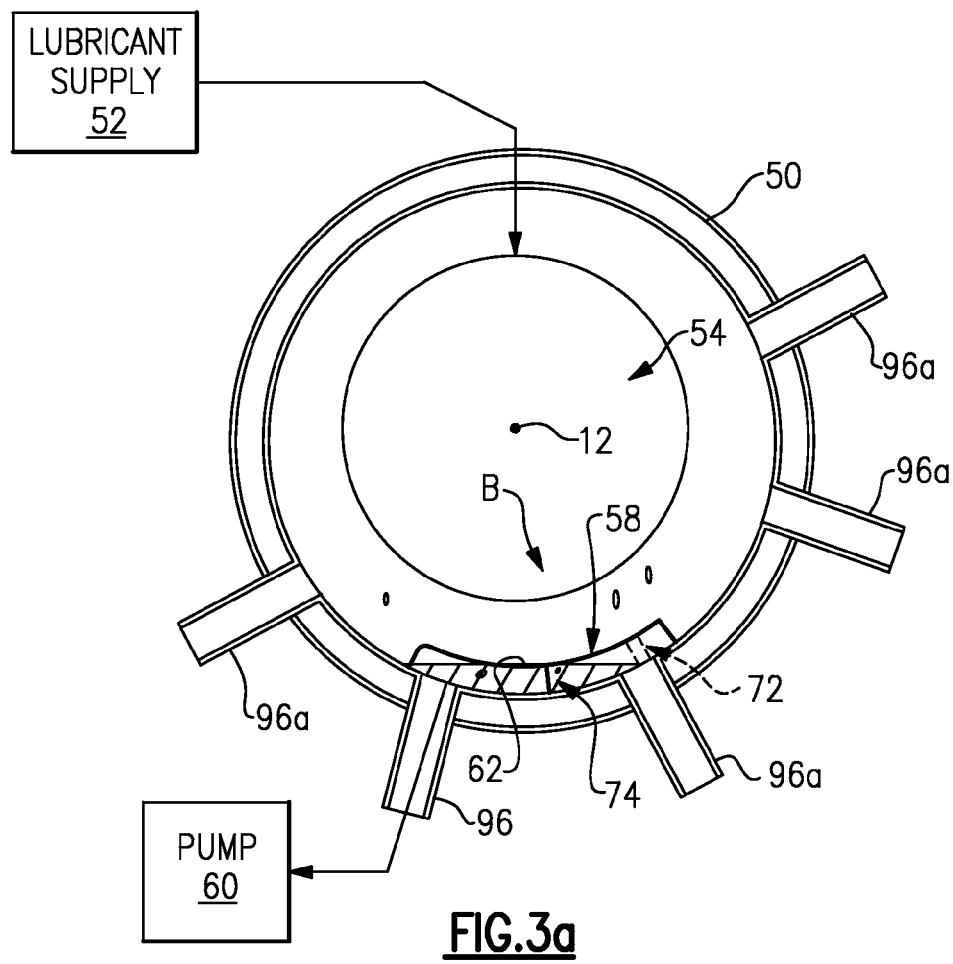
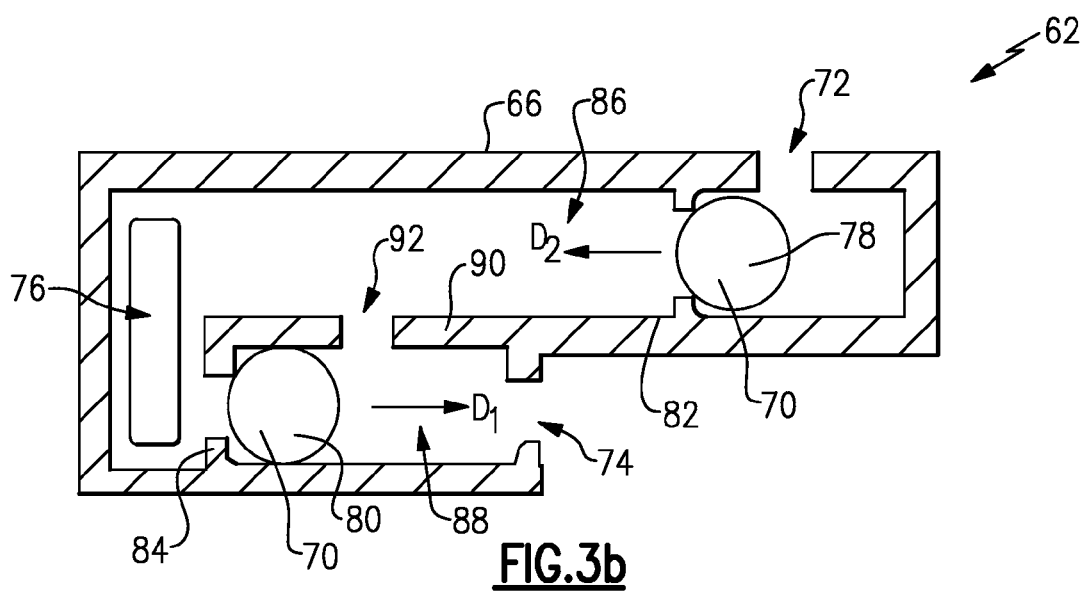

VALVE FOR CONTROLLING FLOW OF A TURBOMACHINE FLUID

BACKGROUND

This disclosure relates generally to turbomachines and, more particularly, to managing a flow of a turbomachine fluid.

Turbomachines, such as geared turbofan engines, are well known. Turbomachines include multiple sections, such as a fan section, a compressor section, a combustor section, a turbine section, and an exhaust section. Bearing compartments include bearings, etc., that rotatably support and rotatably couple the components in many of these sections. Turbomachines are often used to propel aircraft.

Turbomachine fluid, such as lubricant, is moved through the bearing compartments to cool and lubricate the components therein. Lubrication removes thermal energy from components and reduces friction between components. Used lubricant collects in a sump within the bearing compartment. Lubricant is scavenged from the sump and reused. Typically, the level of used lubricant within the sump is kept below the moving components. Submerging moving components within the used lubricant can affect the efficiency of the moving components. Maneuvers of the aircraft may also cause the height of the used lubricant to rise above the level of the moving components.

SUMMARY

An exemplary valve device for controlling flow of a turbomachine fluid includes a housing and a flow control assembly within the housing. The housing has a first inlet, a second inlet, and an outlet. Movement of the housing to a first orientation causes the flow control assembly to move to a first position to restrict flow of a turbomachine fluid into the housing through the second inlet. Movement of the housing to a second orientation causes the flow control assembly to move to a second position to restrict flow of the turbomachine fluid into the housing through the first inlet.

An exemplary turbomachine assembly includes a first turbomachine fluid container and a second turbomachine fluid container. A valve device housing communicates a turbomachine fluid between the first and second turbomachine fluid containers. The valve device housing has a first inlet, a second inlet, and an outlet. A flow control assembly controls the flow of a turbomachine fluid through the valve device housing. The flow control assembly is movable to a first position to restrict flow of a turbomachine fluid through a first inlet. The flow control assembly is movable to a second position to restrict flow of the turbomachine fluid through the second inlet.

An example method of controlling a turbomachine fluid flow includes communicating a flow of a turbomachine fluid away from a sump through a valve device. The method alternates between communicating the flow into the valve device through a first inlet or a second inlet based on the elevation of the first inlet relative to the second inlet.

DESCRIPTION OF THE FIGURES

The various features and advantages of the disclosed examples will become apparent to those skilled in the art from the detailed description. The figures that accompany the detailed description can be briefly described as follows:

FIG. 2b shows a sectional view of an example flow control assembly viewed along direction B in FIG. 2a.

FIG. 3a shows the section view of FIG. 2a when the geared turbofan engine is rotated in a counter-clockwise direction.

FIG. 3b shows a section view of the example flow control assembly when the geared turbofan engine is in the position of FIG. 3a.

FIG. 4b shows a section view of the example flow control assembly when the geared turbofan engine is in the position of FIG. 4a.

DETAILED DESCRIPTION

Figure 1:
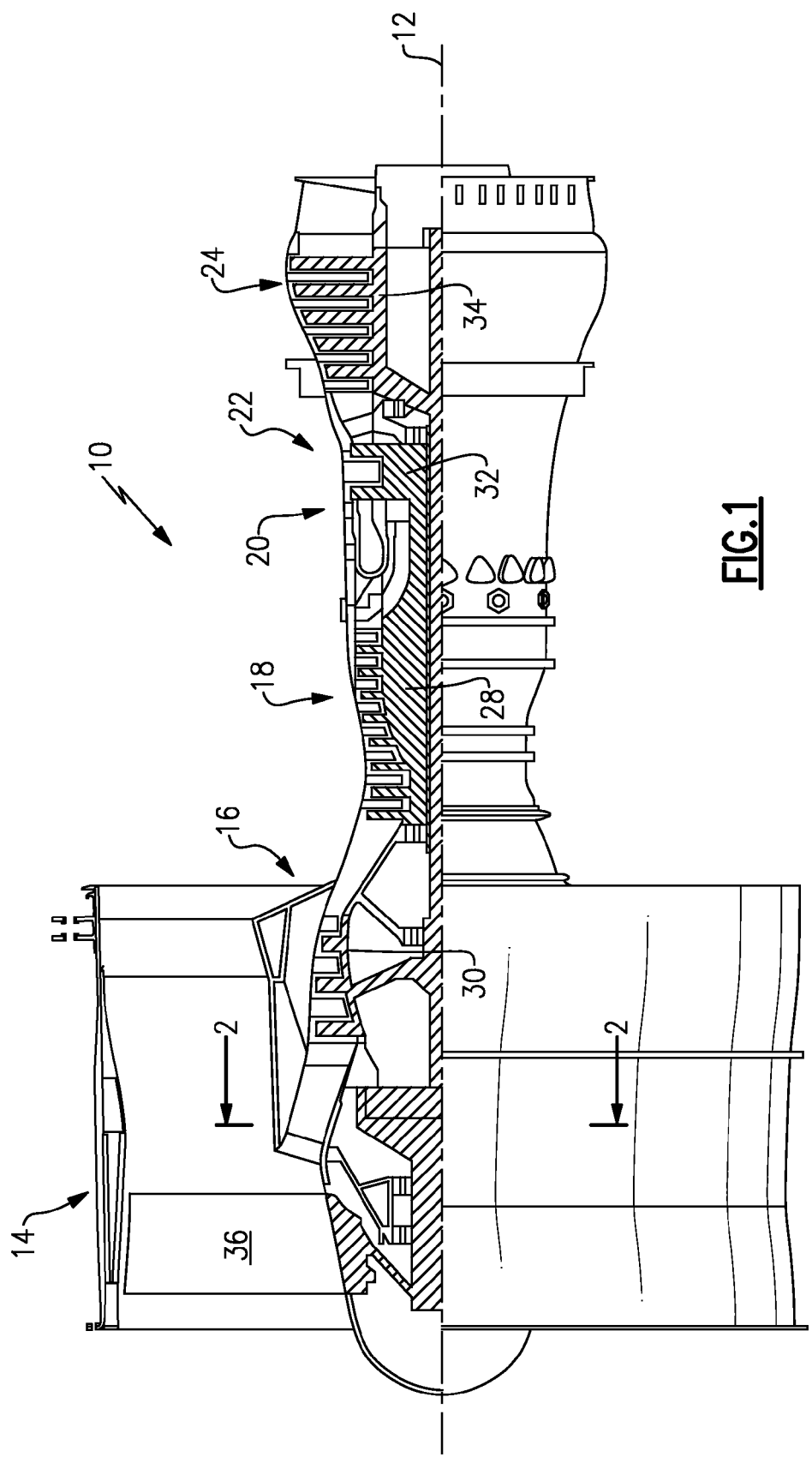
FIG. 1 shows a cross-section of an example geared turbofan engine.

Referring to FIG. 1, an example turbomachine, such as a geared turbofan engine 10, is circumferentially disposed about an axis 12. The geared turbofan engine 10 includes a fan section 14, a low-pressure compressor section 16, a high-pressure compressor section 18, a combustion section 20, a high-pressure turbine section 22, and a low-pressure turbine section 24. Other example turbomachines may include more or fewer sections.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The high-pressure compressor section 18 includes a rotor 28. The low-pressure compressor section 16 includes a rotor 30. The rotors 28 and 30 are configured to rotate about the axis 12.

The high-pressure turbine section 22 includes a rotor 32 that is rotatably coupled to the rotor 28. The low-pressure turbine section 24 includes a rotor 34 that is rotatably coupled to the rotor 30. The rotors 32 and 34 are configured to rotate about the axis 12 in response to expansion. When rotated, the rotors 32 and 34 drive the high-pressure compressor section 18 and the low-pressure compressor section 16. The rotor 34 also rotatably drives a fan 36 of the fan section 14.

The examples described in this disclosure are not limited to the two-spool geared turbofan engine architecture described, and may be used in other architectures, such as a single-spool axial design, a three-spool axial design, and still other architectures. That is, there are various types of geared turbofan engines, and other turbomachines, that can benefit from the examples disclosed herein.

Figure 2A:
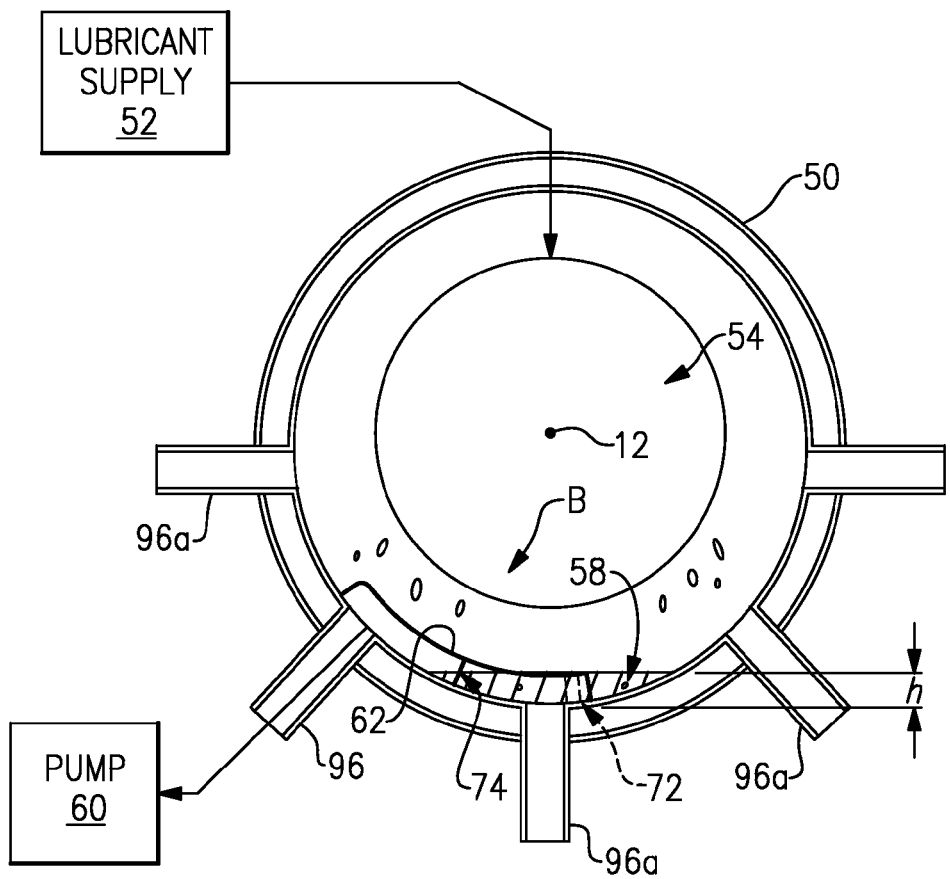
FIG. 2a shows a section view at section 2-2 in FIG. 1.
Figure 2B:
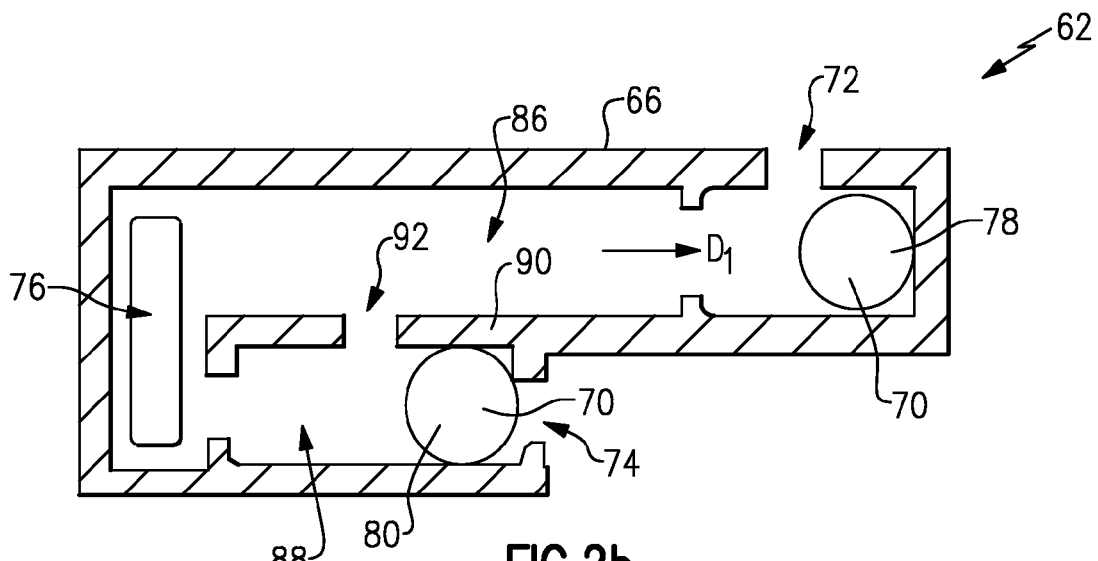

Referring to FIGS. 2a and 2b with continuing reference to FIG. 1, a bearing compartment 50 houses a fan drive gear system 54. The rotors 34 and 30 are rotatably coupled to the fan 36 through the fan drive gear system 54. A person having skill in this art and the benefit of this disclosure would understand gear systems suitable for coupling the fan 36 to the rotors 30 and 34.

A lubricant supply 52 provides lubricant to the fan drive gear system 54. The lubricant is circulated through the fan drive gear system 54 to cool and lubricate the fan drive gear system 54. The bearing compartment 50 is a turbomachine fluid container because the bearing compartment 50 contains a turbomachine fluid. Gravity causes lubricant that has been circulated and expelled from the fan drive gear system 54 to collect in a sump 58 at the bottom of the bearing compartment 50. The remaining portions of the bearing compartment 50 are filled with air. Notably, the bearing compartment 50 may rotate about the axis 12, but the sump 58 remains at the gravitational bottom of the bearing compartment 50 during such rotations.

An engine pump 60 communicates lubricant from the sump 58 to remove lubricant from the bearing compartment 50. The lubricant removed by the pump 60 is cooled and reused.

The fluid height h of the sump 58 varies depending on the amount of the lubricant within the sump 58. Removing lubricant from the sump 58 reduces the height h. Removing lubricant from the bearing compartment 50 also ensures that portions of the fan drive gear system 54 (or any other moving components within the bearing compartment 50) are not submerged within the lubricant collecting in the sump 58.

A valve device 62 is used to communicate lubricant from the sump 58 to the pump 60. The valve device 62 includes a housing 66 and a flow control assembly 70. The housing 66 includes a first inlet 72, a second inlet 74, and an outlet 76. Lubricant typically enters the valve device 62 through the first inlet 72 or the second inlet 74. Lubricant exits the valve device 62 through the outlet 76 regardless whether the lubricant entered the valve device through the first inlet 72 or the second inlet 74.

The flow control assembly 70 controls where the flow of the lubricant enters the valve device 62. When the valve device 62 is in the orientation of FIGS. 2a and 2b, the flow control assembly 70 is in a position that restricts flow through the second inlet 74 and permits flow through the first inlet 72.

The orientation shown in FIGS. 2a and 2b, corresponds to the engine 10 (and its associated aircraft) being in straight and level flight. The flow control assembly 70 is heavier than the lubricant. Thus, in this orientation, gravity causes the flow control assembly 70 to move to the lowest possible position within the valve device 62. In this position, the flow control assembly 70 permits flow through the first inlet 72 and restricts flow through the second inlet 74.

When the engine 10 is in the position of FIGS. 2a and 2b, the uppermost portion of the first inlet 72 is not elevated as much as the uppermost portion of the second inlet 74. In this orientation, the first inlet 72 is less likely to suck in air than the second inlet 74. There is thus less likelihood of air in the bearing compartment 50 entering the valve device 62 than if the second inlet 74 were used to communicate lubricant into the valve device 62. The fluid height h is maintained above the level of the second inlet 74.

The orientation of the valve device 62 controls the position of the flow control assembly 70, and thus the communication of lubricant into the valve device 62 through the first inlet 72 or the second inlet 74. The fluid height h adjusts depending on whether the first inlet 72 or the second inlet 74 is open.

FIGS. 3a and 3b show the valve device 62 in another orientation where the bearing compartment 50 in rotated counter-clockwise about 30 degrees from the position shown in FIGS. 2a and 2b. The positioning in FIGS. 3a and 3b corresponds to the aircraft (and the engine 10) in a left bank position.

Rotating the bearing compartment 50 to this orientation causes the valve device 62 to rotate relative to the lubricant within the sump 58. In this example, rotating the bearing compartment 50 to the position shown in FIGS. 3a and 3b causes the first inlet 72 to be elevated above the level of lubricant within the sump 58. In this position, if the first inlet 72 were used to communicate lubricant into the valve device 62, the fluid height h in the bearing compartment 50 would be at the level of the first inlet 72.

The valve device 62 prevents flow of lubricant (and air) into the valve device 62 through the first inlet 72 when the bearing compartment 50 is rotated to the position of FIGS. 3a and 3b. Specifically, in this position, gravity causes the flow control assembly 70 to fall to a position that permits lubricant to enter the valve device 62 through the second inlet 74, restricts flow of lubricant into the valve device 62 through the first inlet 72, and maintains fluid height h above the level of the inlet 74.

Figure 4A:
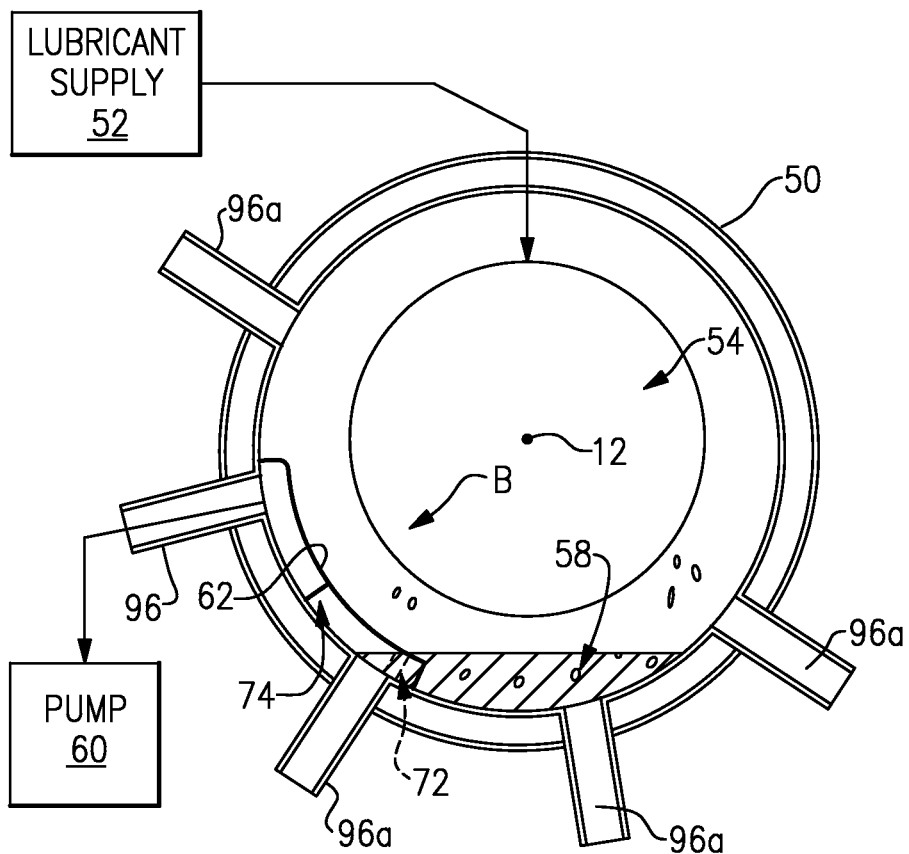
FIG. 4a shows the section view of FIG. 2a when the geared turbofan engine is rotated in a clockwise direction.
Figure 4B:
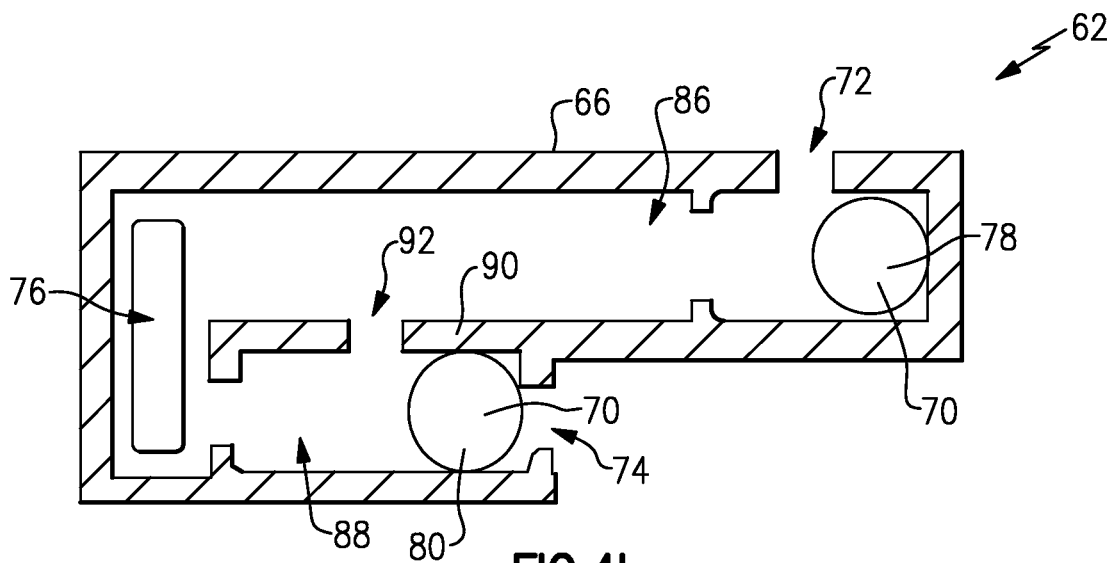

FIGS. 4a and 4b show the valve device 62 in another orientation where the bearing compartment 50 is rotated clockwise about 30 degrees from the position shown in FIGS. 2a and 2b. The positioning in FIGS. 4a and 4b corresponds to the aircraft (and the engine 10) in a right bank position.

Rotating the bearing compartment 50 to the orientation of FIGS. 4a and 4b causes the valve device 62 to rotate relative to the lubricant within the sump 58. In this example, rotating the bearing compartment 50 to the position shown in FIGS. 4a and 4b causes the second inlet 74 to be elevated above the level of lubricant within the sump 58. In this position, if the second inlet 74 were used to communicate lubricant into the valve device 62, the fluid height h in the bearing compartment 50 would be up to the level of the second inlet 74 and potentially interfering with the fan drive gear system 54 or other moving components.

The flow control assembly 70 prevents flow of lubricant (and air) into the valve device 62 through the second inlet 74 when the bearing compartment 50 is rotated to the position of FIGS. 4a and 4b. Specifically, in this position, gravity causes the flow control assembly 70 to fall to a position that permits lubricant to enter the valve device 62 through the first inlet 72 and restricts flow of lubricant into the valve device 62 through the second inlet 74.

The example valve device 62 alternates between opening the first inlet 72 or the second inlet 74 depending on the circumferential orientation of the bearing compartment 50 relative to the axis 12. However, in other examples, other changes in orientation are possible to trigger the changes between inlets. For example, changing the pitch of the aircraft may change the orientation of another valve device and cause the inlet locations on that valve device to change.

The example flow control assembly 70 includes a first spherical member 78 and a second spherical member 80. Gravity causes the spherical members 78 and 80 move between the position shown in FIGS. 2b and 4b and the position shown in FIG. 3b. Although spherical in this example, other flow control assemblies may include members having other shapes.

When the spherical members 78 and 80 are in the position of FIGS. 2b and 4b, walls of the housing 66 limits movement of the spherical members 78 and 80 in a direction $D_1$.

When the spherical members 78 and 80 are in the position of FIG. 3b, a rib support 82 limits movement of the spherical member 78 in a direction $D_2$, and a rib support 84 limits movement of the spherical member 80 in the direction $D_2$.

In one example, the spherical member 78 is made of a pliable material that seals against the rib support 82 to block all movement of lubricant entering the first inlet 72 from communicating to the outlet 76 when the valve device 62 is in the position of FIG. 3b. The spherical members 78 and 82 could be fabricated from metallic materials, non-metallic materials, or some combination of these.

Similarly, the spherical member 80 may be made of a pliable material that seals against the walls of the housing 66 defining the second inlet 74 when the bearing compartment 50 is in the position of FIGS. 2a and 4a.

The spherical member 78 moves back and forth in the directions $D_1$ and $D_2$ within a first channel 86. The spherical member 80 moves back and forth in directions $D_1$ and $D_2$ within a second channel 88. The first channel 86 and the second channel 88 extend circumferentially relative to the axis 12. The first channel 86 extends circumferentially further from the outlet 76 further than the second channel 88.

A dividing wall 90 separates the first channel 86 from the second channel 88. The dividing wall 90 extends circumferentially relative to the axis 12. An aperture 92 within the dividing wall 90 fluidly connects the first channel 86 to the second channel 88, which allows lubricant from the second channel 88 to enter the outlet 76.

The first inlet 72 communicates lubricant into the first channel 86. The first inlet 72 is an axially facing inlet. The second inlet 74 communicates lubricant into the second channel 88. The second inlet 74 is a circumferentially facing inlet. Although described as axially and circumferentially facing inlets, inlets that face in other directions are used in other examples.

After communicating through the valve device 62 and moving through the outlet 76, lubricant moves through conduit within a strut 96 to the pump 60.

Several other struts 96a are circumferentially distributed about the bearing compartment 50. In this example, only the strut 96 is used to communicate lubricant away from the sump 58. The other struts 96a include components preventing communication of lubricant.

Features of the disclosed examples include a valve device having a selective inlet location depending on an orientation of the valve device.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A valve device for controlling flow of a liquid, comprising:
   a housing having a first inlet, a second inlet, and an outlet; and
   a flow control assembly within the housing, wherein movement of the housing to a first orientation causes the flow control assembly to move to a first position to restrict flow of a liquid into the housing through the second inlet, and movement of the housing to a second orientation causes the flow control assembly to move to a second position to restrict flow of the liquid into the housing through the first inlet, wherein said flow control assembly comprises a first flow control member and a second flow control member that is separate from the first flow control member, wherein the first inlet has a first elevation and the second inlet has a second elevation, the first elevation lower than the second elevation when the housing is in the first orientation, the first elevation higher than the second elevation when the housing is in the second orientation.

2. The valve device of claim 1, wherein the flow control assembly in the first position permits flow of the liquid into the housing through the first inlet, and the flow control assembly in the second position permits flow of the liquid into the housing through the second inlet.

3. A valve device for controlling flow of a fluid, comprising:
   a housing having a first inlet, a second inlet, and an outlet; and
   a flow control assembly within the housing, wherein movement of the housing to a first orientation causes the flow control assembly to move to a first position to restrict flow of a fluid into the housing through the second inlet, and movement of the housing to a second orientation causes the flow control assembly to move to a second position to restrict flow of the fluid into the housing through the first inlet, wherein the first inlet has a first elevation and the second inlet has a second elevation, the first elevation lower than the second elevation when the housing is in the first orientation, the first elevation higher than the second elevation when the housing is in the second orientation.

4. The valve device of claim 3, wherein said flow control assembly comprises a spherical member.

5. The valve device of claim 3, wherein said flow control assembly sinks in the fluid.

6. The valve device of claim 3, including a rib support within the housing that locates the flow control assembly in the first position or the second position.

7. The valve device of claim 3, wherein the fluid exits the housing through the outlet.

8. The valve device of claim 3, wherein the housing in the first orientation is rotated relative to the housing in the second orientation.

9. A turbomachine assembly, comprising:
   a first fluid container;
   a second fluid container;
   a valve device housing that communicates a fluid between the first and second fluid containers, the valve device housing having a first inlet, a second inlet, and an outlet;
   a flow control assembly that controls the flow of a fluid through the valve device housing, the flow control assembly moveable to a first position to restrict flow of a fluid through a first inlet, and moveable to a second position to restrict flow of the fluid through the second inlet; and
   a rib support within the housing that locates the flow control assembly in the first position or the second position.

10. The turbomachine assembly of claim 9, wherein flow moves between the second inlet and the outlet when the flow control assembly is in the first position, and flow moves between the first inlet and the outlet when the flow control assembly is in the second position.

11. The turbomachine assembly of claim 9, wherein said flow control member is moveable by rotation of the housing.

12. The turbomachine assembly of claim 9, wherein the flow control assembly blocks flow through the first inlet when in the first position, and blocks flow through the second inlet when in the second position.

13. The turbomachine assembly of claim 9, wherein the first turbomachine container houses a turbomachine fan drive gear system.

14. The turbomachine assembly of claim 9, wherein the first turbomachine container comprises the sump of a bearing compartment.

15. The turbomachine assembly of claim 9, wherein the second turbomachine container is a pump that moves the fluid through the valve device housing.

16. A method of controlling a fluid flow, comprising:
   communicating a flow of a fluid away from a sump through a valve device;
   alternating between communicating the flow into the valve device through a first inlet or a second inlet based on the elevation of the first inlet relative to the second inlet; and
   moving a flow control member between a first position that permits flow through the first inlet and restricts flow through the second inlet to a second position that permits flow through the second inlet and restricts flow through the first inlet, wherein the flow control member comprises a first flow control member and a second flow control member that is separate from the first flow control member.

17. The method of claim 16, wherein elevating the second inlet above the first inlet restricted flow position in the valve housing and a less restricted flow position in the valve housing.

18. The method of claim 16, locating the flow control member and the first position or the second position against a rib support within an interior of the valve device.

* * * * *